(12) United States Patent
Okano et al.

(10) Patent No.: US 7,292,271 B2
(45) Date of Patent: Nov. 6, 2007

(54) PROCESS AND APPARATUS FOR TAKING SLOW MOTION PICTURE, AND PROCESS AND APPARATUS FOR TAKING AND PLAYING SLOW MOTION PICTURE

(75) Inventors: Fumio Okano, Tokyo (JP); Masayuki Sugawara, Tokyo (JP); Kohji Mitani, Tokyo (JP); Takayuki Yamashita, Tokyo (JP)

(73) Assignee: Nisson Hoso Kyokai, Tokyo (JP)

( * ) Notice: Subject to any disclaimer, the term of this patent is extended or adjusted under 35 U.S.C. 154(b) by 689 days.

(21) Appl. No.: 10/405,084

(22) Filed: Apr. 2, 2003

(65) Prior Publication Data
US 2003/0231250 A1    Dec. 18, 2003

(30) Foreign Application Priority Data
Apr. 4, 2002   (JP)   .............................. 2002-102496

(51) Int. Cl.
*H04N 5/225*   (2006.01)
*H04N 13/02*   (2006.01)

(52) U.S. Cl. .................. 348/218.1; 348/47; 348/220.1

(58) Field of Classification Search ............. 348/218.1, 348/49, 153, 56; 382/154, 294, 295
See application file for complete search history.

(56) References Cited

U.S. PATENT DOCUMENTS 5,659,323 A * 8/1997 Taylor ........................ 348/159
6,057,878 A * 5/2000 Ogiwara et al. ............... 348/56
6,523,956 B2 * 2/2003 Oshima ....................... 352/166
2003/0007089 A1 * 1/2003 Rosiene et al. .......... 348/384.1

FOREIGN PATENT DOCUMENTS

JP   4-172790    6/1993
JP   5-316402    11/1993

* cited by examiner

Primary Examiner—Ngoc-Yen Vu
Assistant Examiner—Nicholas G Giles
(74) Attorney, Agent, or Firm—Kratz, Quintos & Hanson, LLP (57) ABSTRACT

A process for taking a slow motion picture is disclosed which comprises: setting a plurality of cameras each having a shutter so that each of them can take an image with a similar view; and continuously taking fields of a subject by said a plurality camera in a timely staggered manner. In this process, timing of opening the shutter of each camera is staggered so that each camera takes a picture timely staggered, and a time for opening the shutter of each cameras is set to be a shorter than one field time of said each camera. Also, disclosed is an apparatus for taking a slow motion picture, which comprises: a plurality of cameras each having a shutter, arranged so that each of them can take an image with a similar view; means for setting the opening time of the shutter, which sets the timing for opening the shutter of each camera to be staggered so that each camera takes a picture timely staggered, and which makes the picture taken by each camera shorter than one field time of said each camera; and a recorder which records the pictures taken by each camera.

12 Claims, 7 Drawing Sheets

PROCESS AND APPARATUS FOR TAKING SLOW MOTION PICTURE, AND PROCESS AND APPARATUS FOR TAKING AND PLAYING SLOW MOTION PICTURE

BACKGROUND ARTS

1. Field of the Invention

The present invention relates to a process and an apparatus for taking a slow motion picture, and a process and an apparatus for taking and playing a slow motion picture. More specifically, the present invention relates to a process and an apparatus for taking a slow motion picture concerning a phenomenon that occurs at a high speed at a high frame rate, and a process and an apparatus for taking and playing a slow motion picture of such a phenomenon at a high frame rate.

2. Description of Related Arts

Generally, in the case where a slow motion picture is taken and played in a smooth manner, the picture is taken and recorded with a larger number of fields per second than the filed number per second in a usual case, and the recorded data is played at the usual field number per second. For example, when a television picture according to the usual NTSC (National Television System Committee) where data is recorded at 60 fields per second is converted into doubled slow motion picture, the data may be taken at 120 fields per second and then the recorded data may be played at 60 fields per second.

However, if one takes and plays a slow motion picture of a special high frame rate (hereinafter, referred to as "rate-raised slow motion picture") in order to analyze the movement of an athlete, a natural phenomenon such as water current, an explosive phenomenon or a destruction phenomenon, he or she will have a difficulty in doing so with a conventional process or apparatus.

Specifically, when a rate-raised slow motion picture is to be taken in the conventional manner, a camera and recording device (recorder) having an imaging element operable at an enough speed for the raised rate are required as a rule. Consequently, special devices different from the conventional standard are required and a technical problem will occur if the recording frame rate becomes higher than a certain frame rate.

An object of the present invention is, therefore, to provide a process and an apparatus for taking a slow motion picture with a plurality of cameras which are not necessarily of a raised operation speed type, and a process and an apparatus for taking a slow motion picture with a plurality of cameras which are not necessarily of a raised operation speed type and play the slow motion picture.

SUMMARY OF THE INVENTION

A process for taking a slow motion picture according to the present invention comprises:

setting a plurality of cameras each having a shutter so that said plurality of cameras have substantially equivalent fields view;

causing each of said plurality of cameras to take a picture of a subject one after another with a predetermined time interval, wherein an opening period of the shutter of each of said plurality of cameras is set to be shorter than one field time of each of said plurality of cameras; and recording the pictures taken by said plurality of cameras.

In process of the present invention, the shutters of the plurality of cameras are continuously opened.

An apparatus for taking a slow motion picture according to the present invention comprises: a plurality of cameras each having a shutter, arranged so that each of them can take an image with a similar view; means for setting the opening time of the shutter, which sets the timing for opening the shutter of each camera to be staggered so that each camera takes a picture timely staggered, and which makes a taking period of the picture taken by each camera shorter than one field time of said each camera; and means for recording the pictures taken by said plurality of cameras.

In one preferred embodiment of the apparatus according the present invention, the plurality of the cameras are be converged toward the subject.

Alternatively, in another preferred embodiment of the apparatus according the present invention, the plurality of the cameras may be preferably arranged parallel to each other on the same plane.

In another preferred embodiment, the apparatus may further possess means for adjusting a parallel position, which conducts a coordinates conversion in which the picture taken by each camera is parallel-translated so that it is equivalent to a picture taken by a given camera amongst said plurality of cameras.

The means for adjusting a parallel position may calculate a distance Ls from each camera to the subject based upon the swerving of the pictures taken by at least two cameras and a distance between the cameras for comparing the pictures, and may conduct coordinates conversion based upon the calculated distance Ls.

In the another preferred embodiment, the apparatus may further comprise a parallel optical system which converts the light radically spread from the subject into parallel lights toward the camera, provided between said plurality of cameras and the subject.

According to the present invention, there is a provided a process for taking and playing a slow motion picture which comprises:

setting a plurality of cameras each having a shutter so that said plurality of cameras have substantially equivalent fields of view;

causing each of said plurality of cameras to take a picture of a subject one after another with a predetermined time interval, wherein an opening period of the shutter of each of said plurality of cameras is set to be shorter than one field time of each of said plurality of cameras, recording the pictures taken by said plurality of cameras; and playing a slow motion picture by outputting the recorded pictures in an order of pictures taken by said plurality of cameras.

According to the present invention, there is a provided an apparatus for taking and playing a slow motion picture, which comprises:

a plurality of cameras each having a shutter, arranged so that each of them can take an image with a similar view;

means for setting the opening time of the shutter, which sets the timing for opening the shutter of each camera to be staggered so that each camera takes a picture timely staggered, and which makes the picture taken by each camera shorter than one field time of said each camera;

a recorder which records the pictures taken by each camera, and means for playing a slow motion picture which displays each of the recorded pictures at a field number smaller than the field number per second of the total of said plurality of cameras at the time of taking the picture in the order at the time of taking the picture, to thereby play a slow motion picture.

The apparatus for taking and playing a slow motion picture according to the present invention may have a configuration similar to that of the apparatus for taking a slow motion picture according to the present invention just mentioned.

In one preferred embodiment of the apparatus according to the present invention said means for recording the pictures comprises means, connected with each camera, for recording a picture taken by the camera.

In one preferred embodiment of the apparatus according to the present invention said means for recording the pictures comprises:

means for temporarily storing the pictures taken by said plurality of cameras; and means for recording said temporarily stored pictures in an order of a picture-taking time.

In one preferred embodiment of the apparatus according to the present invention said means for recording the pictures comprises said plurality of means, connected with respective cameras, for recording pictures taken by said respective cameras, and wherein said means for reproducing a slow motion picture comprises means for causing said plurality of means for recording pictures to sequentially output said recorded pictures in an order of a picture-taking time and for multiplexing the output pictures to form said slow motion picture.

In one preferred embodiment of the apparatus according to the present invention said means for recording the pictures comprises:

means for temporarily storing the pictures taken by said plurality of cameras; and means for recording said temporarily stored pictures in an order of a picture-taking time, and wherein said means for reproducing a slow motion picture causes said means for recording said temporarily stored pictures to output the recorded pictures at a predetermined rate.

DESCRIPTION OF THE PREFERRED EMBODIMENTS

Embodiments of the present invention will now be described by referring to the drawings.

Figure 1:
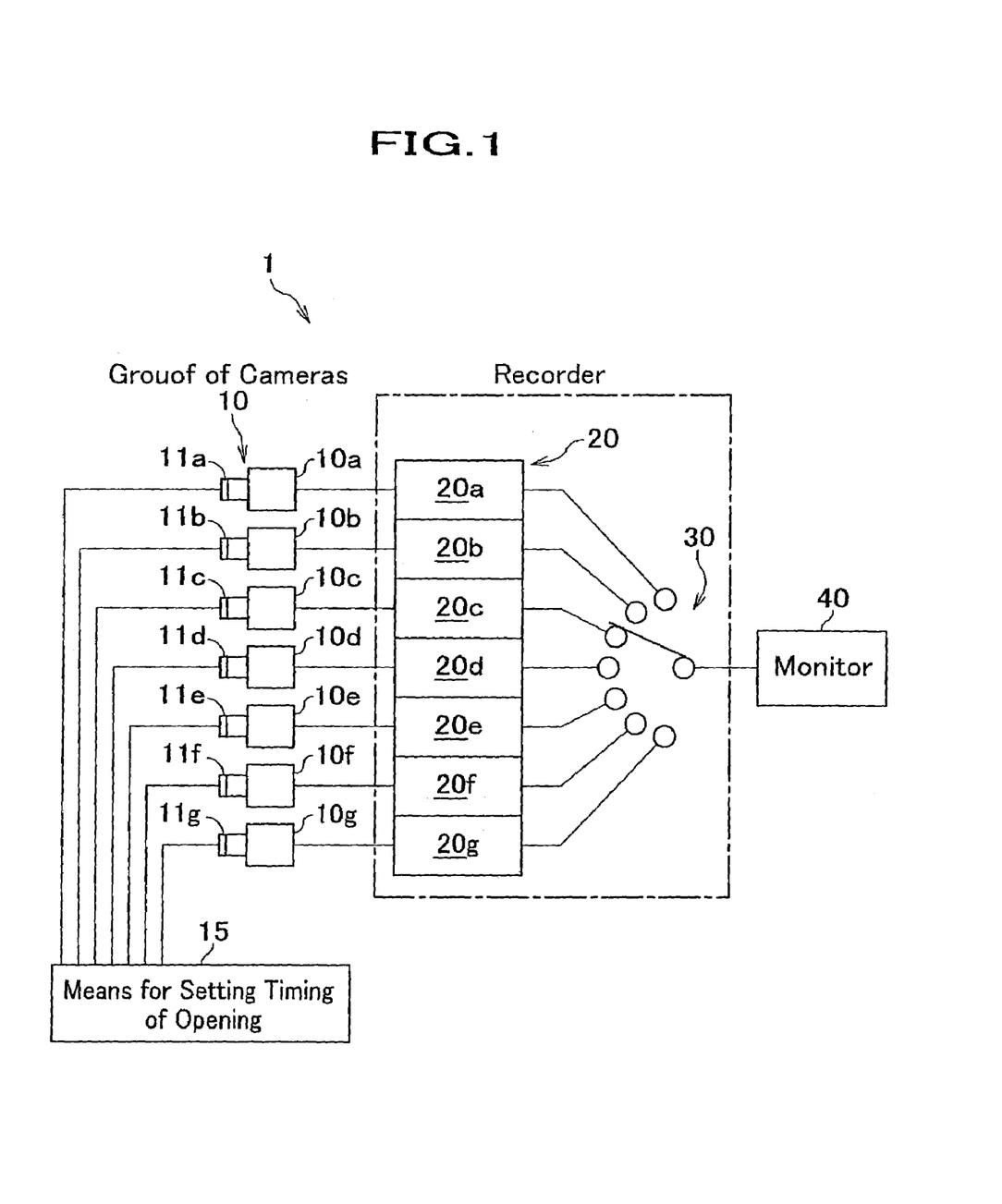
FIG. 1 is a drawing showing a configuration of an apparatus for taking and playing a slow motion picture according to one embodiment of the present invention.

FIG. 1 is a drawing showing a configuration of an apparatus for taking and playing a slow motion picture according to one embodiment of the present invention.

As shown in FIG. 1, an apparatus for taking and playing a slow motion picture according to one embodiment of the present invention (hereinafter referred to as "apparatus 1") has a group 10 of cameras comprising first to seventh cameras 10a-10g (hereinafter simply referred to as "camera 10" when no camera is specified); first to seventh recorders 20a-20g (hereinafter simply referred to as "recorder 20" when no recorder is specified); and a switcher 20, which switches the connections between a camera 10 to another camera 10. A combination of playing function possessed by recorder 20 with the switcher 30 corresponds to a slow motion playing function.

The first to seventh cameras 10a to 10g comprise usual cameras known per se with having first to seventh shutters 11a to 11g (hereinafter simply referred to as "shutter 11" when no shutter is specified), which divide the period of picture to be taken into short period of time, respectively. The shutter 11 may be composed of a curtain including, but being not restricted to rotatable disc having an opening, which mechanically shield a light provided in front of, on the way to the lens possessed by the camera 10. The shutter 11 intended herein is not restricted to such a mechanical curtain, and may be configured so that signals from CCD are electrically turned on and off to divide the period of picture into short period of time.

Figure 2A:
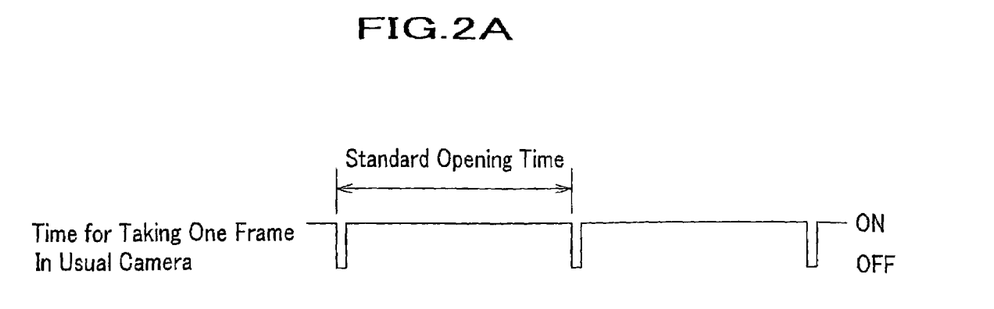
FIG. 2A is graph showing the time schedule of taking one frame of image in a usual camera.
Figure 2B:
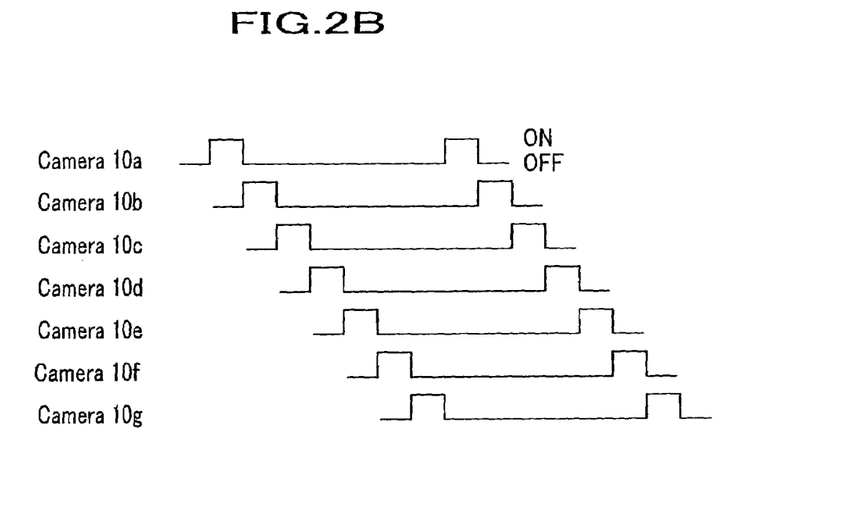
FIG. 2B is a graph showing the timing of the opening the shutter of each camera according to one embodiment of the present invention.
Figure 2C:
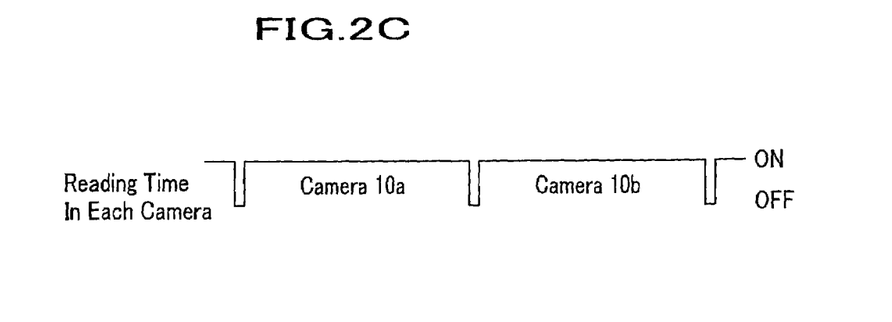
FIG. 2C is a graph showing the timing of reading the data in each camera when the slow motion picture is played by the apparatus for taking and playing a slow motion picture according to one embodiment of the present invention.

In each shutter 11, the states of ON and OFF are controlled by means 15 for setting timing of opening. In FIG. 2 and also FIG. 7, which will be described later on, the higher portions in these graphs express the state where a picture is taken or played (ON) and the lower portions in these graphs expresses the state where the picture is broken (OFF).

The means 15 for setting timing of opening controls the shutter so that each shutter 11 is opened for a period of the time as short as that a normal period of time for taking one filed by the camera 10 shown in FIG. 2A (hereinafter referred to as "standard opening time") is divided by a number of the cameras 10 utilized (in this case ⅟₇). The standard opening time corresponds to one field time described in the attached claims.

For example, as shown in FIG. 2B, the timing of opening the shutter 11 is controlled so that the shutters 11 of plural cameras are sequentially opened. Explaining the examples shown in FIG. 2B, the first shutter 11a of the first camera 10a is first opened and closed, and immediately thereafter the shutter 11b of neighboring second camera 10b is then opened and closed. The similar operations are repeated, and the seventh shutter 11g of the seventh camera 10g is opened and closed, and immediately thereafter, the first shutter 11a of the first camera 10a is again opened and closed. As described above such operations are gradually repeated. As for the order of the timing of the opening the shutter, the shutter may be opened and closed in any voluntary order irrespective the position of each camera.

The opening time of each camera 10 is not restricted to the equally divided period divided by the number of the camera (in the case of FIG. 2, {fraction (1/7)}), and may be longer or shorter than the equally divided time. The shorter the opening time is more desirable because the blurring of the picture may be minimized. However, if the opening time is too short, an amount of light becomes small accordingly and, thus, the opening time is preferably adjusted within a legible range depending upon the brightness of the lens and sensitivity of the CCD camera. On the other hand, if a much more amount of light is required, the opening time may be set to be longer period of time. In such a case, there is a possibility that the picture will be blurred. Accordingly, the opening time will be adjusted depending upon the speed of the subject. Both in the case where the opening time is set to be long and to be short, it is desirable to set the time interval between the openings of one shutter 11 and the next shutter 11 to a period of the standard opening time divided by the number of the cameras utilized ({fraction (1/7)} in FIG. 7).

However, the present invention is not restricted as just described in setting the shutter-opening opening time interval For example, assuming that six cameras are set, the opening time of each shutter 11 is set to be {fraction (1/12)}, so that each of six cameras takes two fields within the standard opening time. Also, assuming that six cameras are set, the opening time of each shutter 11 is set to be {fraction (1/12)}, so that each three cameras takes one field within the standard opening, each of the remaining three cameras takes one field within the next standard opening time, and similar operations are repeated.

The recorder 20 is a well-known recorder, which has a function that a recorded picture can be intermittently read out per one field. The medium used in the recorder 20 may be any media such as semiconductor memory, videotape, DVD-RAM, hard disk drive.

The number of the recorders 20 is not necessarily a plurality, for example, the field taken by each cameras 10 may be captured in one computer as a digital image, and may be read into a hard disk drive possessed by the computer.

The monitor 40 is a well-known monitor, and is not restricted to a type of monitors such as whether it is a color type or a monochrome type monitor and whether it is a liquid crystal monitor or a cathode ray tube type monitor.

The switch 30 is a device, which switches the signals from the recorders 20 so that only one signal from these signals is passed. As for the switching timing, a signal from a given recorder 20 is connected to the monitor 40 for the period of the standard opening time, and immediately thereafter, the switch 30 switches the connection into the next recorder 20 for the connection to the monitor 40 over a period of the standard opening time. More precisely, the switch 30 is controlled such that the time period from the starting of the connection to a given recorder 20 to the starting of the connection to the next recorder 20 equals the standard opening time. The order of the connection is set so that depending upon the order of the fields recorded by respective recorders 20, the pictures are displayed in the same order.

For example, as shown in FIG. 2C, if the picture is recorded in the order of from the first camera 10a, second camera 10b . . . the seventh camera 10g at the time of recording, the recorder 20 and the monitor 40 are connected while the picture is played in the same order at the time of playing. The detail will be described later on.

Figure 3:
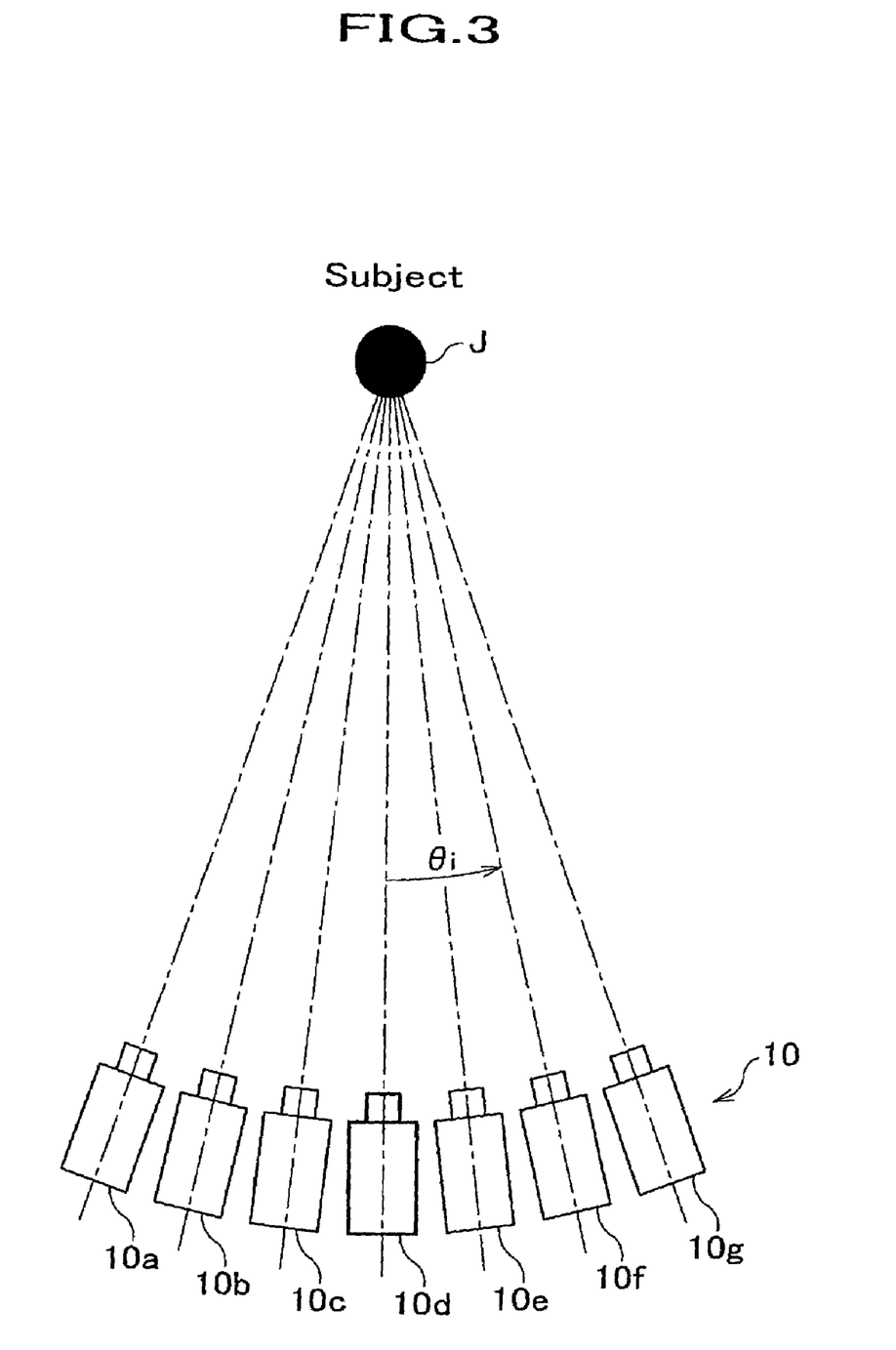
FIG. 3 is a plane view exemplifying the arrangement of a group of camera in apparatus for taking and playing a slow motion picture according to one embodiment of the present invention.

Subsequently, the arrangement of the cameras 10 will be described. FIG. 3 is a plane view exemplifying the arrangement of a group of camera in apparatus for taking and playing a slow motion picture according to one embodiment of the present invention. As shown in FIG. 3, cameras 10 are converged so that all of them are directed toward the subject J. More specifically, on the circle taking the subject J as the center, the each lens of the each camera 10 (the direction of taking a picture) is directed towards the subject J. For this reason, the position of the subject J taken by each camera positioned at the same position, for example, at the center, of the display, reducing the blurring and flickering of the subject J at the time of playing.

In the case where the convergence angle θi is large, for example, when a large number of the cameras are used, the directions of the subject J taken by the cameras 10 are different from each other. If the distance of the subject J is far from the camera, these differences are negligible. If these differences are not negligible, the picture may be converted so that the differences of the subjects J seen from each camera become small.

The cameras are preferably arranged so that the distances between them are as near as possible in view of decreasing the difference in the picture taken by each camera, but the present invention is not restricted to such an arrangement.

The apparatus 1 having the configuration as described above are operated as follows.

When a subject J, which moves at a high speed, will be taken, the shutters 11a to 11g are opened step by step by the means for setting timing of opening so that the subject J is taken by the first camera 10a, the second camera 10b, . . . the seventh camera 10g each for the opening time of the shutters 11a to 11g being the standard opening time divided by the number of the cameras in a rotation manner. For example, in the case of the television picture according to NTSC, the standard opening time is 1/60 second. Consequently, when seven cameras for taking television picture for NTSC are used, each shutter 11 is opened for the opening time of 1/420, which is 1/7 of the standard opening time, and the picture is taken step by step from the camera 10a to the camera 10g.

The picture taken from each camera is, for example, recorded by each recorder 20 for recording NTSC television picture over the standard opening time in parallel.

When the picture taken is played, the recorders 20 are used, while operating the switch 30 so that the signal of each field picture is transferred to the monitor 40 in the same order as that at the time of recording each for the standard opening time, i.e., {fraction (1/60)} second, whereby the picture is displayed on the monitor 40.

Explaining the playing of the picture through the recorder 20, for example, in the case where the picture is recorded on a semiconductor memory, the picture taken by the camera 10a at the opening timing shown in FIG. 2A is recorded for the standard field per second, all of the recorders 20 are continuously and intermittently played on the monitor 40 at the timing of once per seven fields, and only when a picture signal is transferred from a given recorder 20, this recorder 20 and the monitor 40 are connected through the switch 30.

According to the operation as described above, the picture displayed on the monitor 40 is displayed as shown in FIG. 2C in the order of the taken field, i.e., the field of the first camera 10a, the field of the second camera 10b, the field of the third camera 10c . . . , over a period of the standard opening time per each field. As a result, the played picture is played as slow motion picture seven times slower than the picture at the time of taking the picture. As described above, according to the apparatus 1 of this embodiment, a rate-raised slow motion picture can be taken and played only by a simple configuration that the shutters 11 and means 5 for setting the opening timing, and the switch 30 are provided on the usual cameras and the recorders. What is more, as long as the sensitivity of the camera 10 is allowed, a number of the cameras 10 and a number of the recorders 20 are increased to operate them in a similar manner, whereby much more magnified slow motion picture can be taken.

The speed at the time of playing is not restricted to the embodiment that one field of the picture is played over a period of the usual one field, and one field of the picture may be played for a longer or shorter than the usual one field to modify the magnification of the slow playing.

Figure 4:
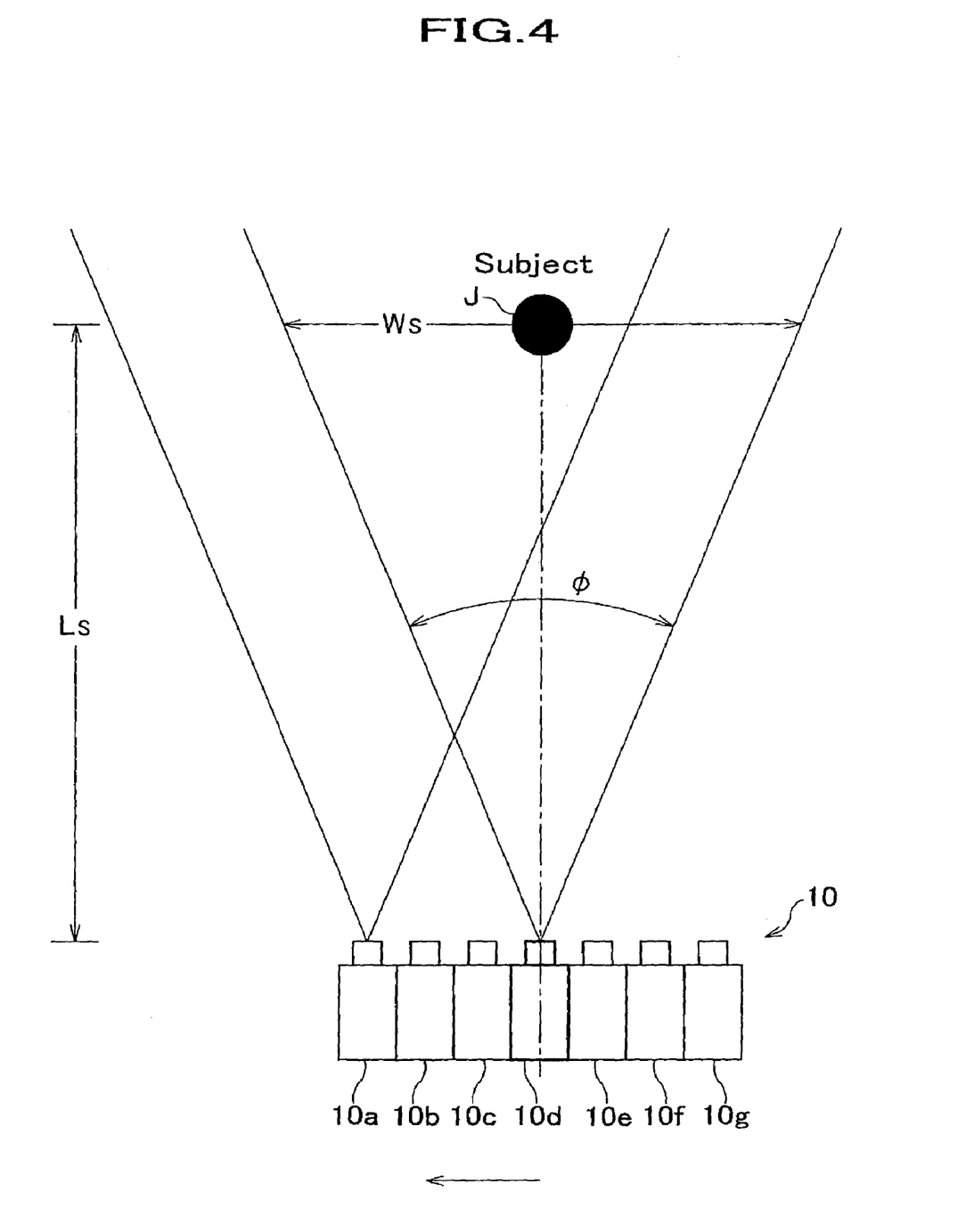
FIG. 4 is a plane view showing another embodiment of the arrangement of the cameras.

Next, another embodiment of the arrangement of the cameras 10 will be described. FIG. 4 is a plane view showing another embodiment of the arrangement of the cameras.

The first to the seventh cameras 10a to 10g shown in FIG. 4 are arranged in parallel to each other on the same plane. In the case where these cameras are arranged as described above, each camera 10 can take substantially the same face of the opposite subject J to be taken. Accordingly, the slow motion picture with minimized blurring and flickering can be taken and played. In the case where the position of the subject J is differed depending upon the cameras 10, e.g., a large number of cameras are used, the position of the taken subject within the display is swerved depending upon the cameras 10. If the distance Ls of the subject J is sufficiently far from the camera 10, these differences are negligible. If the differences of the position on the display are large, e.g., when the distance Ls of the subject J is not sufficiently far from the camera 10, means for converting coordinates may be provided on the apparatus 1 in order to accord the position of the subject J on the display.

For example, an embodiment of FIG. 4 will be described where the standard camera is the fourth camera 10d, and the coordinates conversion is conduced so as to accord the position of the subject J taken by each camera 10 with each other. Assuming that the picture angle of each camera 10 is φ, the range of taking a picture at the distance Ls from camera is Ws, and the distance between (i)th camera and the standard camera (the fourth camera 10d) is Li, the proportion Li/Ws, which parallel-translates the picture within the display in order to accord the position of the subject J within the display is expressed geometrically as:

$Li/Ws = Li/(2Ls \tan(\phi/2))$.

For example, in the case of the first camera 10a in FIG. 1, since the position of the subject J is swerved to the right side at the proportion of Li/(2Ls tan(φ/2)), if the picture is parallel-translated in this proportion, the position of the subject J within the display is accorded with that taken by the standard camera (the fourth camera 10d).

Here, in order to conduct the coordinates conversion, the distance Ls from each camera 10 to the subject J should be understood. The distance Ls can be calculated from the swerving of the subject J in the picture taken by the plurality of the cameras 10.

Figure 5:
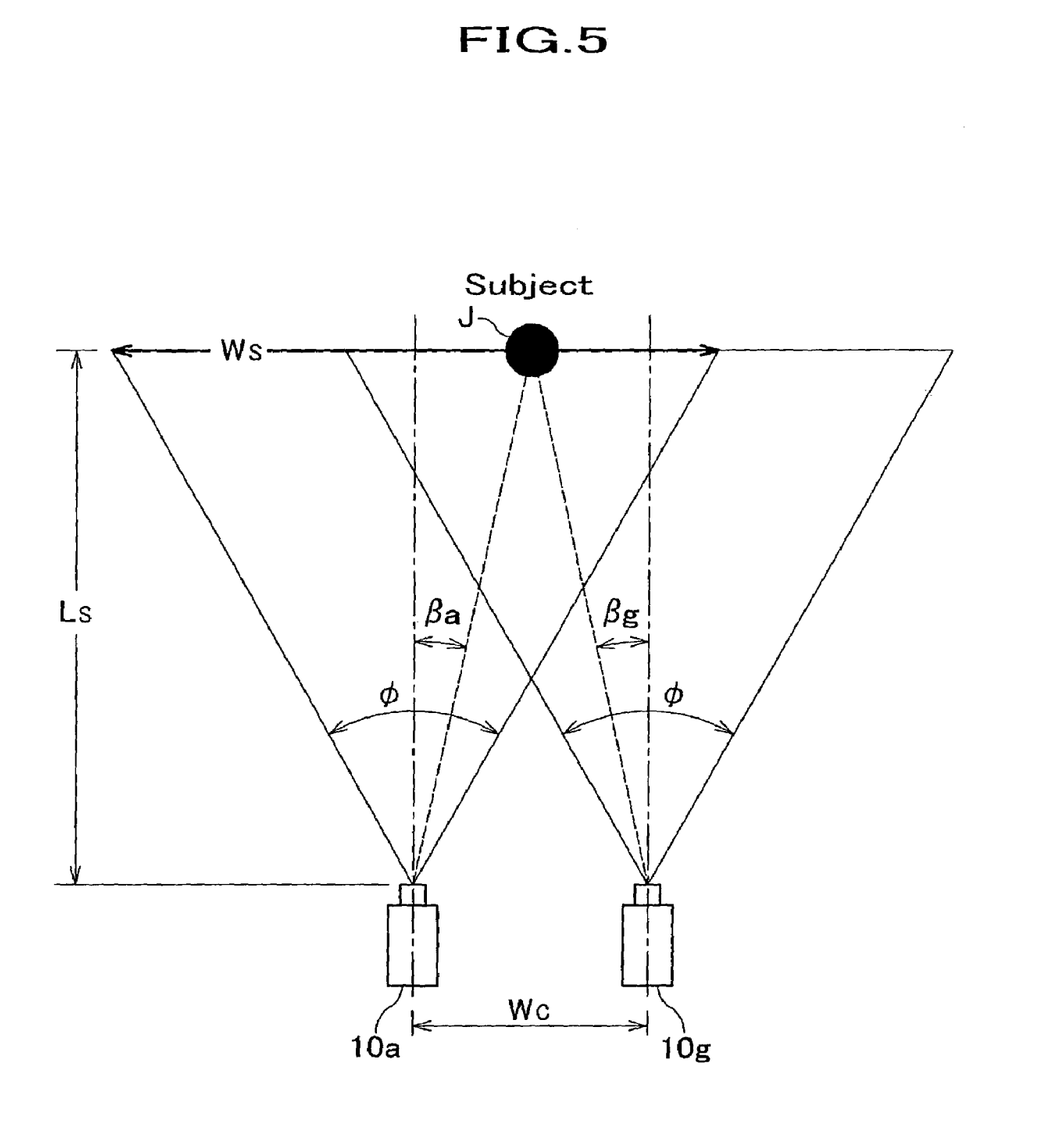
FIG. 5 is a plane view explaining a process for calculating distance LS from two cameras disposed in parallel to a subject having been taken.

FIG. 5 is a plane view explaining a process for calculating distance LS from two cameras disposed in parallel to a subject having been taken. As shown in FIG. 5, for example, the distance from the first camera 10a to the seventh camera 10g is assumed to be Wc. Also, it is assumed that the position of the subject J taken by the first camera 10a within the display is swerved from the center toward the right direction at the angle of βa, and the position of the subject J taken by the seventh camera 10g within the display is swerved from the center toward the left direction at the angle of βg. These angels βa and βg can be calculated by searching the subject J from the picture and determining the swerving of the pixel of the subject J from the center, respectively. At this time, the distance Ls can be expressed geometrically as:

$Ls = Wc/(\tan \beta a + \tan \beta g)$.

The distance Ls can be used to conduct the coordinates conversion in a parallel translation manner. Specifically, the distance Ls is calculated and the position of the subject J is automatically coordinates converted through the apparatus 1, the slow motion picture without blurring and flickering can be taken and played even if the distance from the taking position to the subject J is unknown.

Figure 6:
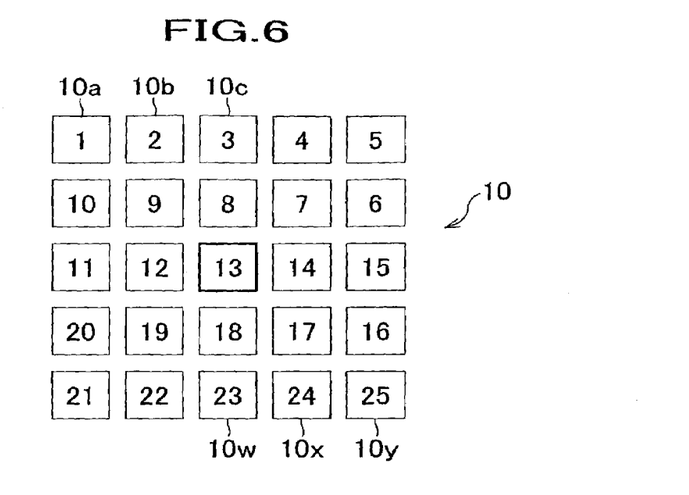
FIG. 6 is a drawing showing arrangement of a plurality of cameras according to still another embodiment of the present invention viewing from backside.

Next, another embodiment of the arrangement of the cameras will now be described. FIG. 6 is a drawing showing arrangement of a plurality of cameras according to still another embodiment of the present invention viewing from backside.

The cameras 10 (10a, 10b, . . . , 10y) shown in FIG. 6 are composed of totally 25 cameras arranged in 5 rows and 5 files in parallel on the same plane. Specifically, when much more cameras 10 are used to take and play a rate-raised slow motion picture, the cameras can be arranged in two-dimension as described above. Here, the number n described within the square in FIG. 6 (in this example, 1-25) is used to call the camera (n)th camera.

Figure 7A:
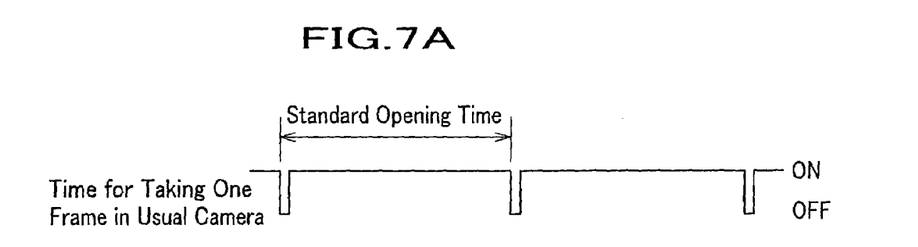
FIG. 7A is a graph showing a field time of a usual camera.
Figure 7B:
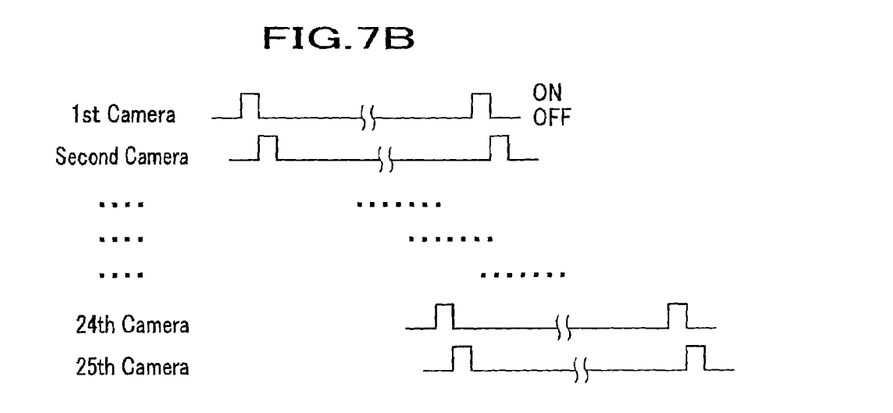
FIG. 7B shows a graph showing the timing of opening the shutter in each camera shown in FIG. 6.
Figure 7C:
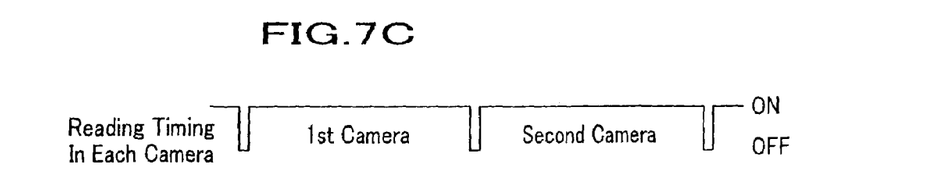
FIG. 7C is a graph showing the timing of reading each camera when the picture taken by each camera shown in FIG. 6 is played.

If the opening time of the usual camera is of a length shown in FIG. 7A, in the apparatus 1 utilizing 25 cameras as shown in FIG. 6, the opening time of each shutter 11 of each camera 10 is shortened to {fraction(1/25)} the standard opening time, the shutters 11 are gradually opened so that the subject J is taken by the first camera 10a, the second camera 10b, . . . the 25th camera 10y. Subsequently, as shown in FIG. 7C, the taken picture is played 25 times slower, i.e., while one field is played for the standard opening time, the connection between the recorder 20 and the monitor 40 is switched in the same order as the order of taking the field. As described above, by increasing the number of the cameras utilized, a rate-raised slow motion picture can be taken and played in the same ways.

The first to 25th cameras are arranged so that the first camera 10a to fifth camera 10e are arranged in one line from the left side to the right side, the sixth camera 10f is arranged just under the fifth camera 10e, the seventh camera 10g to the tenth camera 10f are arranged from the sixth camera 10f toward the left direction; and the remaining cameras are similarly arranged under the former camera, toward the right direction, under the former camera, toward the left direction, under the former camera . . . This arrangement is made so that the cameras taking the neighboring filed are arranged as near as possible. This makes it possible to minimize the difference of the visual field between the neighboring fields, resulting in minimizing the blurring and flickering of the subject. However, the arrangement in the present invention is not restricted thereto, and, for example, the sixth camera 10f may be arranged just under the first camera 10f and the seventh camera 10g to the tenth camera 10k are arranged to the right side from the sixth camera 10f in this order.

Also, in the case where the cameras are arranged in the two dimension as described above, the coordinates conversion may be similarly conducted. Specifically, the parallel translation is conducted not only in the horizontal direction but also in the vertical direction in the same ways, the blurring and flickering of the subject can be minimized.

Figure 8A:
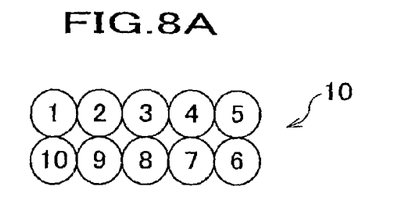
FIGS. 8A and 8B are drawings each showing another embodiment of the arrangement of the cameras.
Figure 8B:
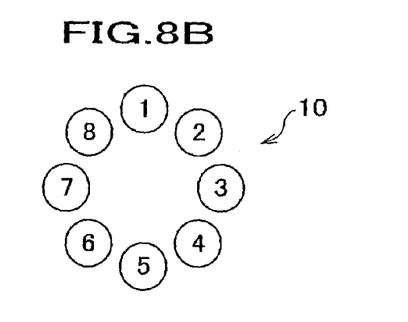

The cameras may be arranged, for example, in 2 rows and 5 files as shown in FIG. 8A, or may be arranged on the circumference at the same distance as shown in FIG. 8B. Also, in any of the arrangements shown in FIG. 8 and FIGS. 8A and 8B, these cameras are not arranged in parallel to each other but may be slanted toward the subject, i.e., converged.

The numbers shown in the circle in the camera expresses the order of opening the shutter 11. Specifically, the order of taking the picture is such that the picture is taken through from one camera to the neighboring camera step by step.

Figure 9:
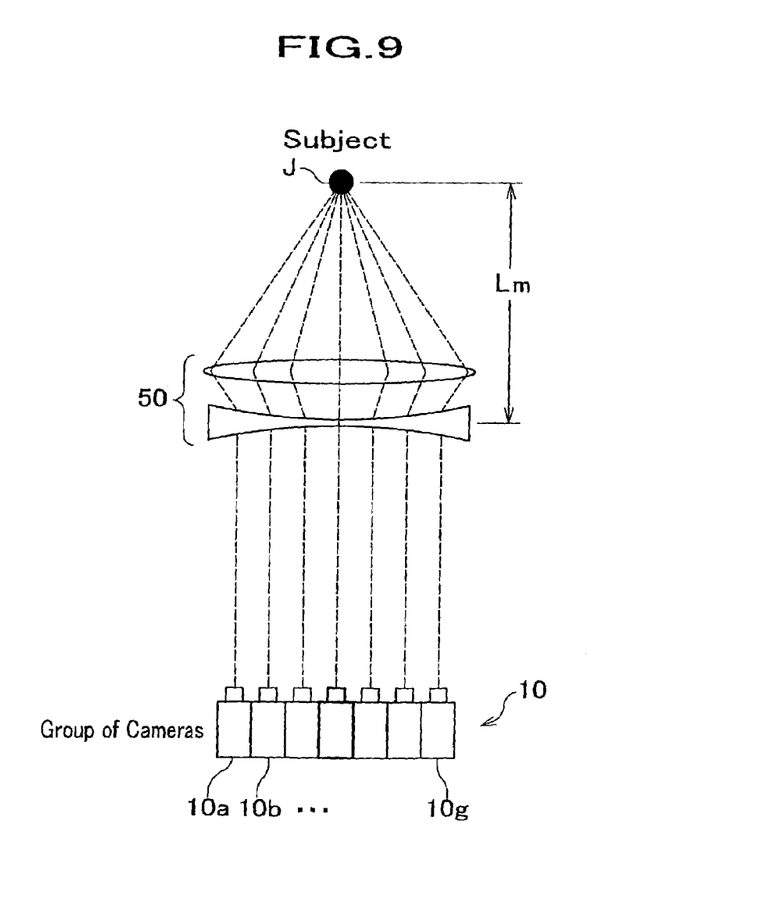
FIG. 9 is a plane view showing the arrangements of an applied example of the camera, parallel optical systems and the subject.

Subsequently, an applied embodiment that the cameras 10 are arranged in parallel will be described. FIG. 9 is a plane view showing the arrangements of an applied example of the camera, parallel optical systems and the subject.

Similar to the cameras 10 shown in FIG. 4, in FIG. 9, the seven cameras 10, i.e., the first to seventh cameras 10a to 10g are arranged in parallel on the same plane. Also, in this embodiment, a parallel optical system 50, which converts the light radically spread from the subject J into parallel lights toward the camera 10, is provided between the camera 10 and the subject J. By this parallel optical system, the light from the subject J is spread in the spherical state and then becomes parallel lights, which enters in each camera 10. Specifically, the picture taken by each camera 10 becomes the picture same as the case the cameras 10 are converged toward the subject J in the spherical state. Consequently, as in the case of FIG. 3 where cameras are converged, the position of the subject J in the picture taken by each camera becomes substantially the same, reducing the blurring and flickering of the subject on the played slow motion picture. In the arrangement of the cameras shown in FIG. 9, the conversion of the light from the subject J into parallel lights by the parallel optical system 50 can be realized, for example, by changing the distance between two lenses making up the parallel optical system 50. In this case, even if the distance Lm from the subject J to the parallel optical system 50 is changed, the adjustment can be made only by correcting the distance between two lenses.

It is noted that since the position of the usual diaphragm for the camera lens is in the parallel lights, the parallel optical system 50 is not restricted that depicted on the figure, and any other parallel optical system having different configuration, e.g., utilizing a mirror, may be applied as long as it is equivalent to the parallel optical system 50 just mentioned.

Also, while the embodiments concerning an apparatus for taking and playing a slow motion picture has been mainly described. The present invention is not restricted thereto. An apparatus for taking a slow motion picture is also within the scope of the present invention. In this case, the playing function may be omitted.

What is claimed is:

1. An apparatus for taking a slow motion picture, which comprises:
    a plurality of cameras each having a shutter, arranged so that each of them can take an image with a similar view;
    means for setting the opening time of the shutter, which sets the timing for opening the shutter of each camera to be staggered so that each camera takes a picture timely staggered, and which makes a taking period of the picture taken by each camera shorter than one field time of said each camera;
    means for recording the pictures taken by said plurality of cameras;
    means for adjusting a parallel position, which conducts a coordinates conversion in which the picture taken by each camera is parallel-translated so that it is equivalent to a picture taken by a given camera amongst said plurality of cameras,
    wherein said plurality of the cameras are arranged parallel to each other on the same plane.

2. The apparatus according to claim 1, wherein said plurality of the cameras converge toward the subject.

3. The apparatus according to claim 1, wherein said means for adjusting a parallel position calculates a distance Ls from each camera to the subject based upon the swerving of the pictures taken by at least two cameras and a distance between the cameras for comparing the pictures, and conducts coordinates conversion based upon the calculated distance Ls.

4. The apparatus according to claim 1, which further comprises a parallel optical system which converts the light radially spread from the subject into parallel lights toward the camera, provided between said plurality of cameras and the subject.

5. The apparatus according to claim 1, wherein said means for recording the pictures comprises means, connected with each camera, for recording a picture taken by the camera.

6. The apparatus according to claim 1, wherein said means for recording the pictures comprises:
    means for temporarily storing the pictures taken by said plurality of cameras; and
    means for recording said temporarily stored pictures in an order of a picture-taking time.

7. An apparatus for taking and playing a slow motion picture, which comprises:
    a plurality of cameras each having a shutter, arranged so that each of them can take an image with a similar view;
    means for setting the opening time of the shutter, which sets the timing for opening the shutter of each camera to be staggered so that each camera takes a picture timely staggered, and which makes a taking period of the picture taken by each camera shorter than one field time of said each camera;
    means for recording the pictures taken by said plurality of cameras; and
    means for playing a slow motion picture by outputting the recorded pictures in an order of pictures taken by said plurality of cameras;
    means for adjusting a parallel position, which conducts a coordinates conversion in which the picture taken by each camera is parallel-translated so that it is equivalent to a picture taken by a given camera amongst said plurality of cameras,
    wherein said plurality of the cameras are arranged in parallel to each other on the same plane.

8. The apparatus according to claim 7, wherein said plurality of the cameras are converged toward the subject.

9. The apparatus according to claim 7, wherein said means for adjusting a parallel position calculates a distance Ls from each camera to the subject based upon the swerving of the pictures taken by at least two cameras and a distance between the cameras for comparing the pictures, and conducts coordinates conversion based upon the calculated distance Ls.

10. The apparatus according to claim 7, which further comprises a parallel optical system which converts the light radically spread from the subject into parallel lights toward the camera, provided between said plurality of cameras and the subject.

11. The apparatus according to claim 7, wherein
said means for recording the pictures is connected with respective cameras, for recording pictures taken by said respective cameras, and wherein
said means for reproducing a slow motion picture comprises means for causing said plurality of means for recording pictures to sequentially output said recorded pictures in an order of a picture-taking time and for multiplexing the output pictures to form said slow motion picture.

12. The apparatus according to claim 7, wherein said means for recording the pictures comprises:
means for temporarily storing the pictures taken by said plurality of cameras; and
means for recording said temporarily stored pictures in an order of a picture-taking time, and wherein
said means for reproducing a slow motion picture causes said means for recording said temporarily stored pictures to output the recorded pictures at a predetermined rate.

* * * * *

UNITED STATES PATENT AND TRADEMARK OFFICE
CERTIFICATE OF CORRECTION

PATENT NO. : 7,292,271 B2
APPLICATION NO. : 10/405084
DATED : November 6, 2007
INVENTOR(S) : Okano et al.

It is certified that error appears in the above-identified patent and that said Letters Patent is hereby corrected as shown below:

Title Page
Item (73) Assignee
change "Nisson Hoso Kyokai, Tokyo (JP)" to be -- Nippon Hoso Kyokai, Tokyo (JP) --

Signed and Sealed this

Seventh Day of October, 2008

JON W. DUDAS
*Director of the United States Patent and Trademark Office*